(12) United States Patent  (10) Patent No.: US 10,107,952 B2
Lim et al.  (45) Date of Patent: Oct. 23, 2018

(54) MOBILE TERMINAL AND METHOD FOR CONTROLLING THE SAME

(71) Applicant: LG ELECTRONICS INC., Seoul (KR)

(72) Inventors: Jaemoon Lim, Seoul (KR); Wonsang Yi, Seoul (KR); Sangjo Ryu, Seoul (KR); Soowook Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 15/491,901

(22) Filed: Apr. 19, 2017

(65) Prior Publication Data

US 2017/0307802 A1 Oct. 26, 2017

(30) Foreign Application Priority Data

Apr. 21, 2016 (KR) ........................ 10-2016-0048941

(51) Int. Cl.
*F21V 7/04* (2006.01)
*F21V 8/00* (2006.01)

(52) U.S. Cl.
CPC ........... *G02B 6/0045* (2013.01); *G02B 6/009* (2013.01); *G02B 6/0068* (2013.01); *G02B 6/0083* (2013.01)

(58) Field of Classification Search
CPC ... G02B 6/0045; G02B 6/0068; G02B 6/0073
See application file for complete search history.

(56) References Cited

U.S. PATENT DOCUMENTS

| 2007/0091640 A1* | 4/2007 | Kim | G02B 6/0016 362/612 |
| 2012/0170309 A1* | 7/2012 | Kim | G02B 6/0081 362/606 |
| 2013/0163279 A1* | 6/2013 | Peng | F21V 7/04 362/609 |
| 2014/0139771 A1* | 5/2014 | Choi | G09G 3/20 349/43 |
| 2016/0187559 A1* | 6/2016 | Li | G02B 6/0021 362/609 |

FOREIGN PATENT DOCUMENTS

| JP | 06308491 | 11/1994 |
| JP | 2005228719 | 8/2005 |
| KR | 20080055065 | 6/2008 |
| KR | 20120078961 | 7/2012 |
| KR | 20140064127 | 5/2014 |

OTHER PUBLICATIONS

PCT International Application No. PCT/KR2016/009959, International Search Report dated Jan. 26, 2017, 10 pages.

* cited by examiner

*Primary Examiner* — Evan Dzierzynski
(74) *Attorney, Agent, or Firm* — Lee, Hong, Degerman, Kang & Waimey PC

(57) ABSTRACT

A mobile terminal according to the present disclosure may include a body, a light-emitting device provided within the body, a display unit disposed on a front surface of the body, and a corner region of which is formed in a curved surface, and a light guide plate disposed at a lower side of the display unit to guide light emitted from the light-emitting device to the display unit, and formed with a chamfer surface at a corner region facing the curved surface, wherein the light-emitting device is disposed adjacent to the chamfer surface to emit light toward the chamfer surface.

20 Claims, 17 Drawing Sheets

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2016-0048941, filed on Apr. 21, 2016, the contents of which is incorporated by reference herein in its entirety.

BACKGROUND OF THE INVENTION

1. Field of the Invention

The present disclosure relates to a mobile terminal disposed with a display unit on a front surface thereof.

2. Description of the Related Art

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

The functionality of the mobile terminal has been diversified. For example, there are functions of data and voice communication, photo capture and video capture through a camera, voice recording, music file reproduction through a speaker system, and displaying an image or video on the display unit. Some terminals may additionally perform an electronic game play function or perform a multimedia play function. In particular, recent terminals may receive multicast signals for providing video contents such as broadcasts, videos, television programs, or the like.

As it becomes multifunctional, for example, such a terminal is allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

For an example of a structural portion of the terminal, the formation of a corner of a bar-type terminal in a round shape may be taken into consideration. Furthermore, the formation of a display unit with the largest area to the maximum extent possible, disposed on a front surface of the terminal, may be taken into consideration. Accordingly, the formation of a corner region in a round shape in such a manner that the entire shape of the display unit corresponds to the shape of the terminal body may be also taken into consideration.

The display unit having such a corner region in a round shape may have a problem causing a decrease of light uniformity.

SUMMARY OF THE INVENTION

An object of the present disclosure is to increase the light uniformity of the display unit having a corner region in a round shape.

Another object of the present disclosure is to provide a mobile terminal having a bezel with a lower thickness.

A mobile terminal according to the present disclosure may include a body, a light-emitting device provided within the body, a display unit disposed on a front surface of the body, and a corner region of which is formed in a curved surface, and a light guide plate disposed at a lower side of the display unit to guide light emitted from the light-emitting device to the display unit, and formed with a chamfer surface at a corner region facing the curved surface, wherein the light-emitting device is disposed adjacent to the chamfer surface to emit light toward the chamfer surface.

According to an embodiment, the chamfer surface may include a first chamfer surface adjacent to a lower end of the body, and a second chamfer surface connected to the first chamfer surface, and adjacent to a lateral surface of the body.

According to an embodiment, the light-emitting device may be disposed only on the first chamfer surface between the first and the second chamfer surface.

According to an example associated with the present disclosure, a plurality of the light-emitting devices may be provided and mounted in one column on a circuit board, and the circuit board may be disposed such that a mounting surface of the circuit board faces a lateral surface of the chamfer surface.

According to an embodiment, the circuit board may be extended from a lower surface of the light guide plate to the first chamfer surface.

According to an embodiment, a light emitting surface of the light-emitting device may be disposed in parallel to the chamfer surface.

According to an embodiment, a height of the light-emitting device may correspond to a thickness of the chamfer surface.

According to an embodiment, a length of the first chamfer surface may be formed to be smaller than that of the second chamfer surface.

According to an embodiment, an inclined portion may be formed at one end of the light guide plate such that a thickness of the light guide plate decreases as it is located closer to an inner side thereof from the one end thereof.

According to an embodiment, the inclined portion may be formed at an upper and a lower side of the light guide plate in a symmetrical manner.

According to an embodiment, an upper corner region of the light guide plate may be formed in a curved surface.

A mobile terminal according to an embodiment of the present disclosure may further include a ground provided within the body, a first conductive member formed to surround one side of the ground, and a second conductive member formed at one side of the first conductive member and formed to surround the other side of the ground, wherein the first and the second conductive member are disposed in directions crossing each other.

According to an embodiment, the first and the second conductive member may be disposed adjacent to each corner region of a lower end of the body.

According to an embodiment, the first and the second conductive member may be disposed between the body and the light guide plate, and at least part thereof may be formed in a shape corresponding to the chamfer surface.

According to an embodiment, one end portion of the first conductive member may be separated from the ground to form a first open slot, and one end portion of the second conductive member may be separated from one end portion of the first conductive member to form a second open slot, and the first and the second open slot may be formed to face either one of the first and the second chamfer surface.

According to an embodiment, the first conductive member may include a first sub-member formed in a first direction, and a second sub-member formed along a second direction crossing the first direction, wherein a length of the first sub-member is larger than that of the second sub-member.

According to an embodiment, the second conductive member may include a third sub-member formed along a third direction, and a fourth sub-member formed along a fourth direction crossing the third direction, wherein a length of the third sub-member is larger than that of the fourth sub-member.

A mobile terminal according to an embodiment of the present disclosure may further include a junction portion formed at one point of the first conductive member to ground the first conductive member to the ground, and a first and a second feeding portion configured to feed power to the first and the second conductive member, respectively. Furthermore, the mobile terminal may further include a third feeding portion configured to feed power to the first conductive member at an opposite position to the first feeding portion around the junction portion on the first conductive member.

According to an embodiment, at least part of the first and the second conductive member may be formed in a curved surface.

Due to a light guide plate structure associated with the present disclosure, light may be more uniformly guided to a display unit having a corner region in a round shape. Specifically, a first and a second chamfer surface may be formed on the light guide plate at a portion facing a corner region of the display unit in a round shape, and a light-emitting device may be disposed only on the first chamfer surface between them, thereby solving a luminance difference for each region generated on the display unit.

Furthermore, according to the present disclosure, a light emitting surface of the light-emitting device may be disposed to face a lateral surface of the light guide plate, thereby reducing the length of a lower bezel.

In addition, according to the present disclosure, a first and a second conductive member may be formed to correspond to a shape of the light guide plate, thereby allowing them to be disposed in a more compact manner within the terminal body.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as a digital TV, a desktop computer, a digital signage and the like, excluding a case of being applicable only to the mobile terminals.

Figure 1A:
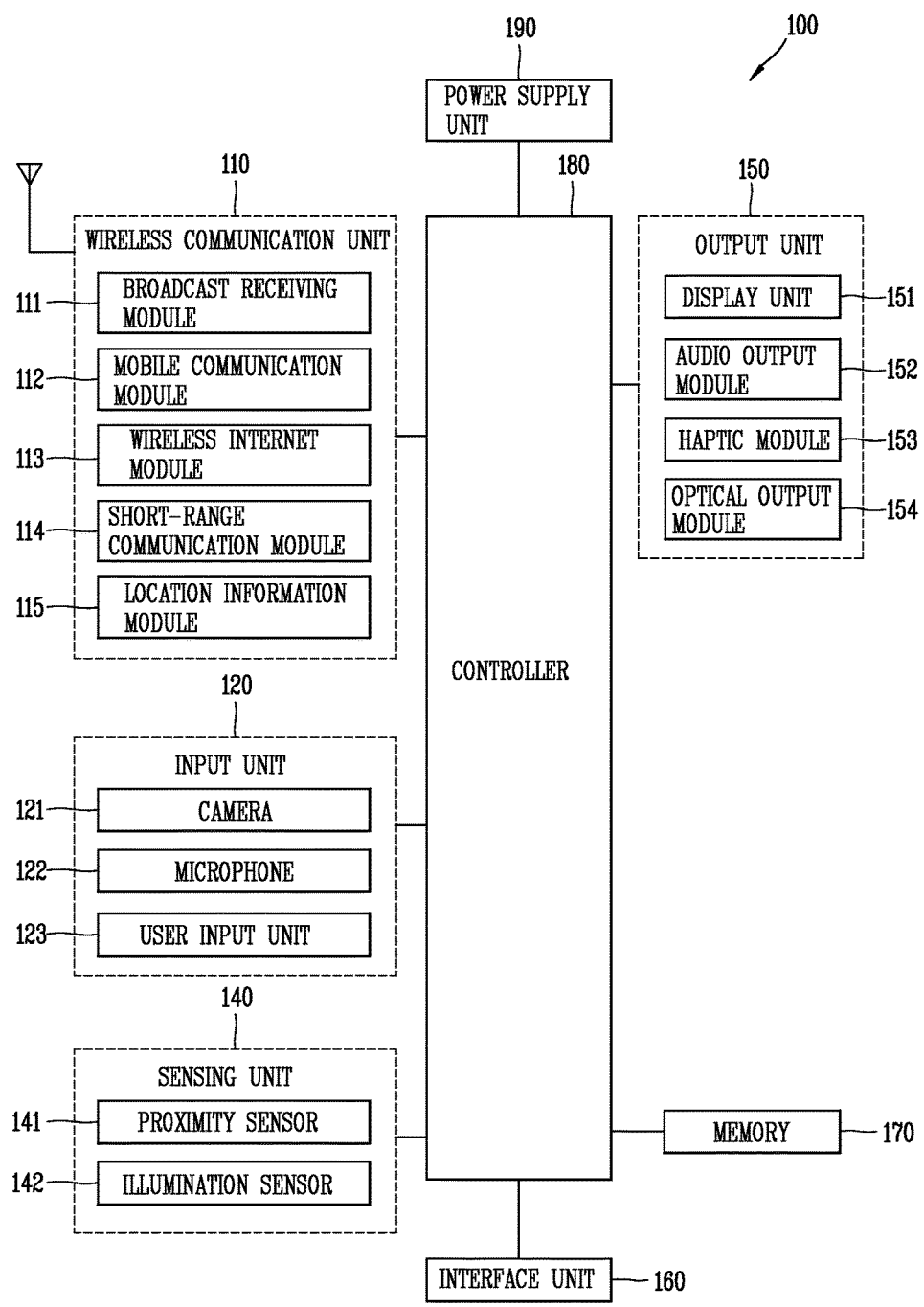
FIG. 1A is a block diagram for explaining a mobile terminal associated with the present disclosure.
Figure 1B:
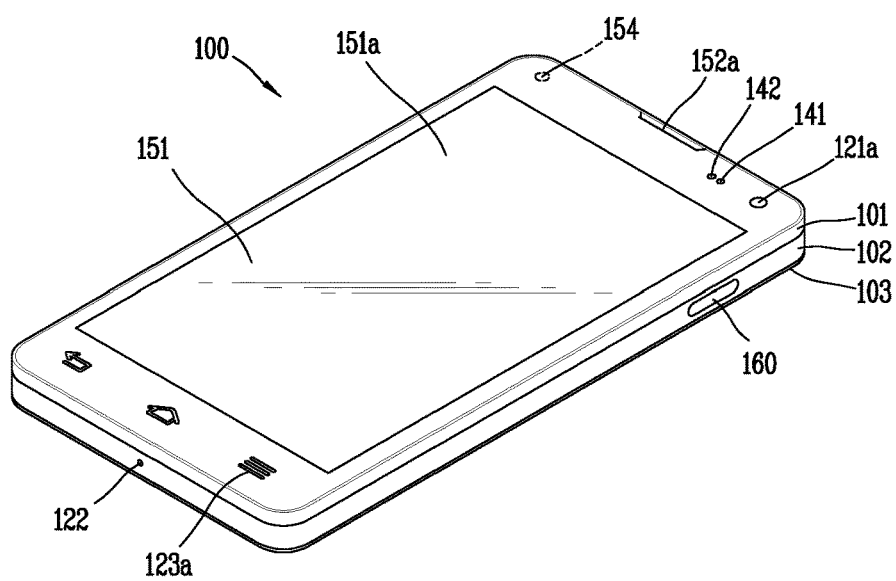
FIGS. 1B and 1C are conceptual views in which an example of a mobile terminal associated with the present disclosure is seen from different directions.

Referring to FIGS. 1A through 10, FIG. 1A is a block diagram of a mobile terminal in accordance with the present disclosure, FIGS. 1B and 10 are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1 illustrates the mobile terminal having various components, but it may be understood that implementing all of the illustrated components is not a requirement. Greater or fewer components may alternatively be implemented. In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store data for supporting various functions of the mobile terminal 100. The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), Long Term Evolution-Advanced (LTE-A), etc.)

The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A) and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in is the mobile terminal 100, the user may check the received message using the wearable device.

The location information module 115 denotes a module for detecting or calculating a position of the mobile terminal. An example of the location information module 115 may include a Global Position System (GPS) module or a Wireless Fidelity (Wi-Fi) module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. As needed, the location information module 115 may perform any function of another module of the wireless communication unit 110 to obtain data for the location of the mobile terminal in a substituted or additional manner. The location information module 115, as a module used to acquire the location (or current location) of the mobile terminal, may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor (for example, CCD, CMOS, etc.) The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like. The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

On the other hand, various embodiments described herein may be implemented in a computer-readable or its similar medium using, for example, software, hardware, or any combination thereof.

Referring to FIGS. 1B and 10, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Figure 1C:
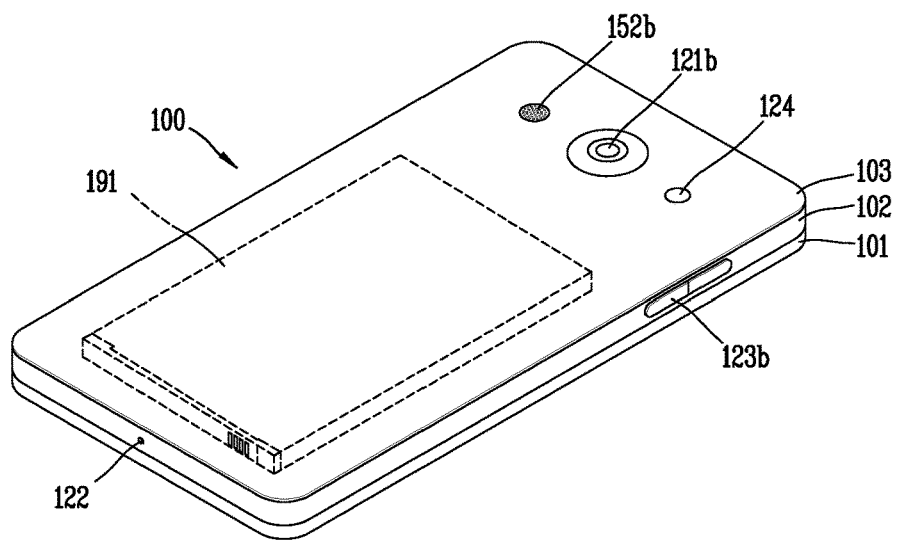

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

However, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, a terminal having a display unit a corner region of which is formed in a round shape will be described with reference to the drawings.

Figure 2:
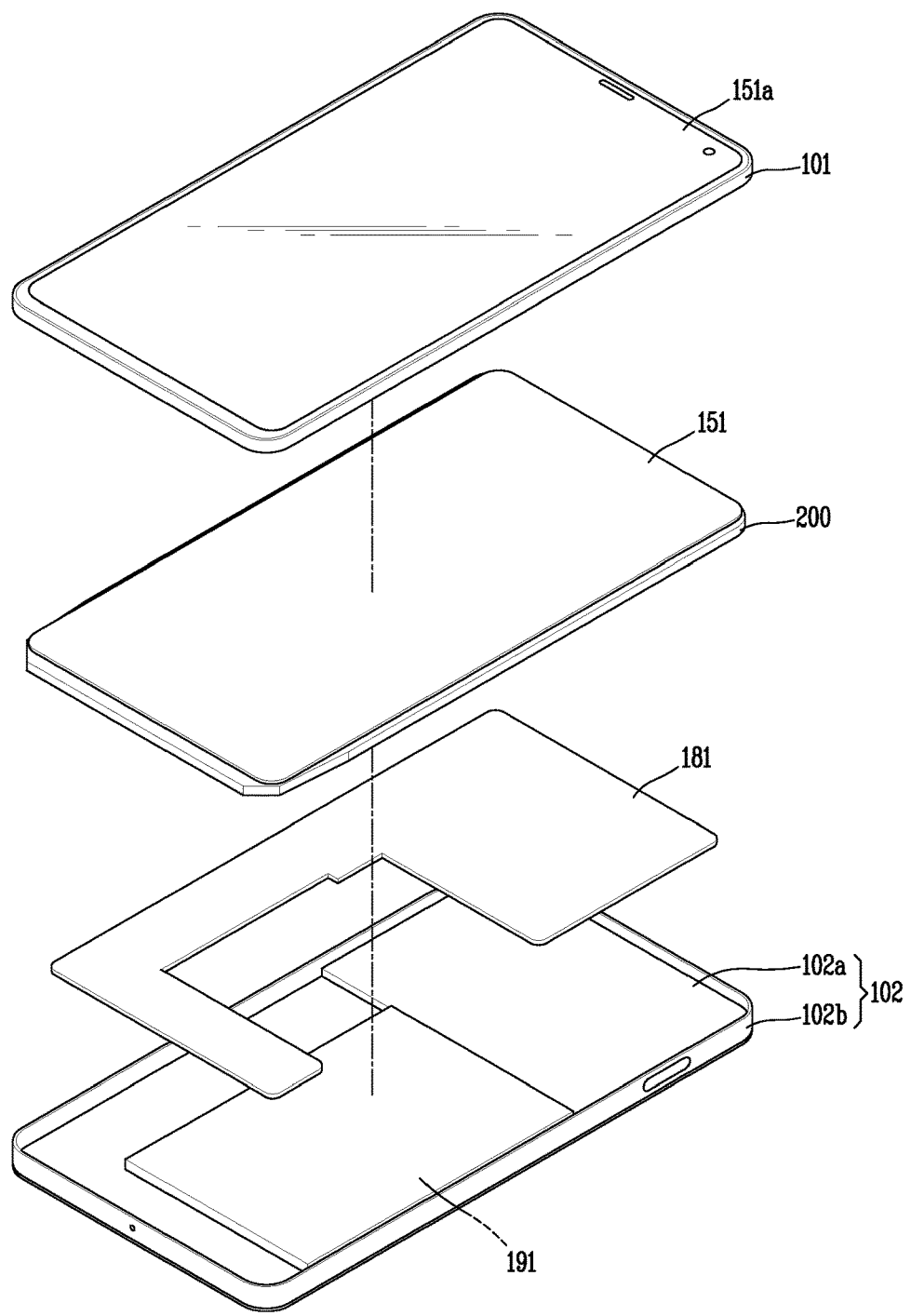
FIG. 2 is an exploded view illustrating a mobile terminal associated with the present disclosure.

FIG. 2 is an exploded view illustrating a mobile terminal associated with the present disclosure.

Referring to FIG. 2, a terminal associated with the present disclosure may include a body and a display unit disposed on a front surface of the body.

The body may be substantially formed in a bar shape, and a corner region portion thereof may be formed in a curved shape. As illustrated in the drawing, the body may include a front case 101 and a rear case 102.

A window 151a of the display unit 151 may be mounted on the front case 101 to form a front surface of the terminal body along with the front case 101.

The display unit 151 may be disposed in a space formed between the front case 101 and the rear case 102. A corner region of the display unit 151 may be formed in a curved surface. The curved surface forming a corner region of the display unit 151 may have a shape corresponding to a curved surface of the body.

A light guide plate 200 may be disposed below the display unit 151 to perform the role of guiding light to the display unit 151. Moreover, the display unit 151 may be placed on one surface of the light guide plate 200.

A adhesive material (not shown) may be disposed between the light guide plate 200 and the display unit 151 to couple them to each other. The adhesive material may be formed in a transparent manner to guide light to the display unit 151 through the adhesive material.

A cross-sectional area of the light guide plate 200 may be formed to be larger than that of the display unit 151. In the foregoing structure, an end portion of the display unit 151 may be disposed at an inner side than an end portion of the light guide plate 200. In other words, a step region formed in a stepped manner may be formed between the display unit 151 and the light guide plate 200.

On the other hand, a printed circuit board 181 for supporting the light guide plate 200 may be disposed below the light guide plate 200. Though not shown in the drawing, various electronic devices may be accommodated into the printed circuit board 181. Furthermore, a feeding portion and junction portion of the antenna which will be described later may be formed on the printed circuit board 181.

The rear case 102 may include a main surface portion 102b covering the printed circuit board 181 and a lateral surface portion 102a formed in a thickness direction of the mobile terminal 100 to form an inner space between the front case 101 and the rear case 102.

Here, the lateral surface portion 102a may be formed of a metal material, and the main surface portion 102b may be formed of a plastic material, but the present disclosure may not be necessarily limited to this.

On the other hand, in FIG. 2, a uni-body type of terminal in which the battery 191 is disposed between the front case 101 and rear case 102 is illustrated, but the present disclosure may not be necessarily limited to this. In other words, the battery 191 may not be disposed between the front case 101 and the rear case 102, and may be also disposed between a rear cover additionally coupled to the rear case 102 and the rear case 102.

Hereinafter, a layout relationship between the display unit 151 and the light guide plate 200 will be described in detail with reference to the accompanying drawings.

Figure 3A:
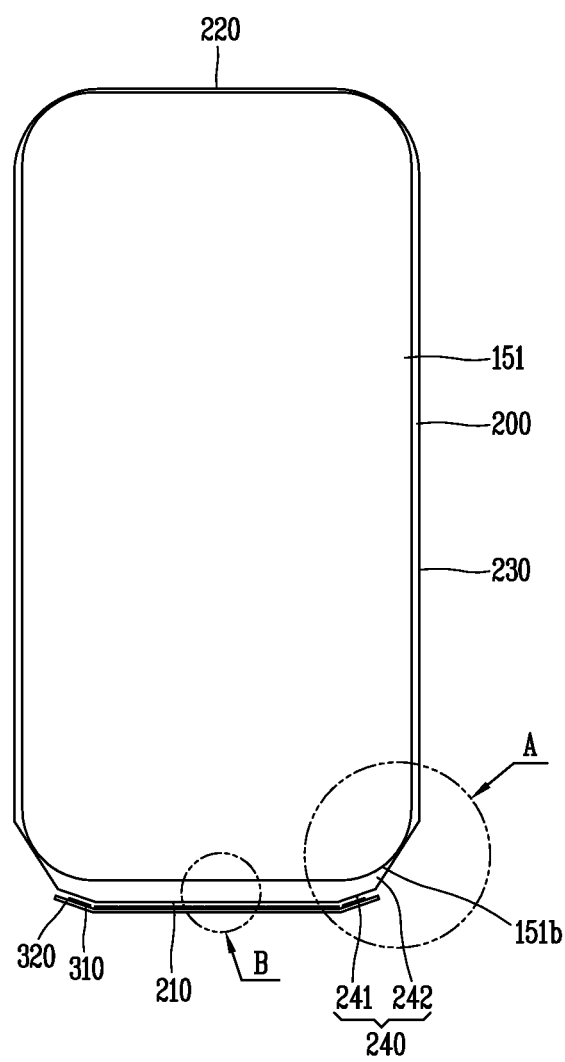
FIG. 3A is a view illustrating a front surface of a display unit and a light guide plate associated with the present disclosure.
Figure 3B:
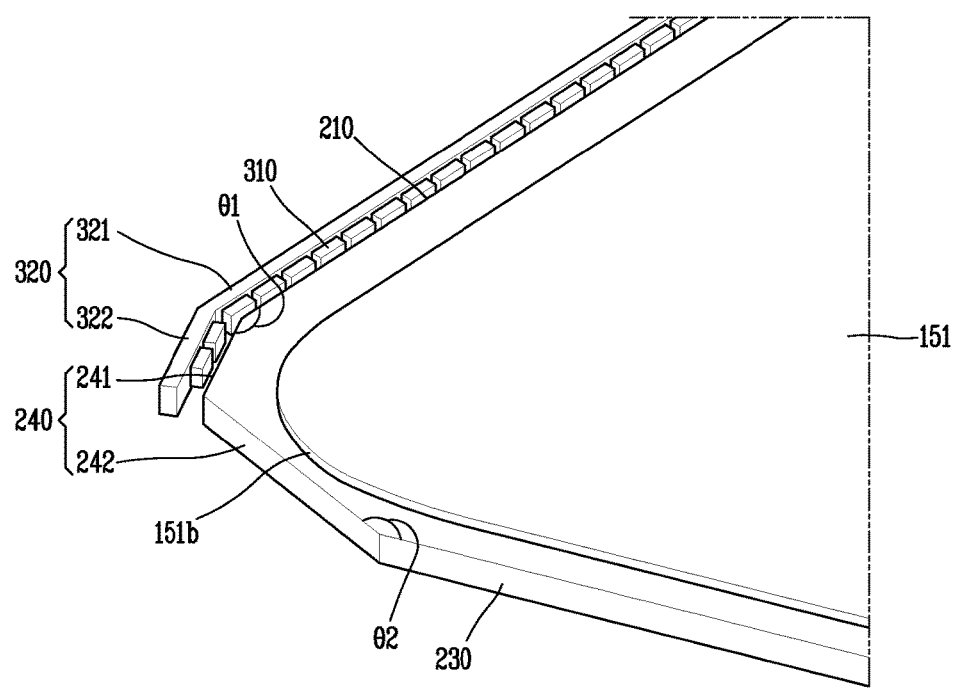
FIG. 3B is an enlarged view illustrating a portion "A" indicated in FIG. 3A.
Figure 4:
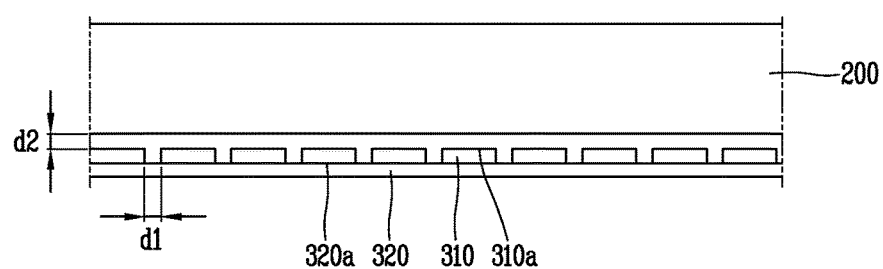
FIG. 4 is an enlarged view illustrating a portion "B" indicated in FIG. 3A.

FIG. 3A is a view illustrating a front surface of the display unit 151 and the light guide plate 200 associated with the present disclosure. FIG. 3B is an enlarged view illustrating a portion "A" indicated in FIG. 3A. FIG. 4 is an enlarged view illustrating a portion "B" indicated in FIG. 3A.

Referring to FIGS. 3A and 3B, as described above, a corner region 151b of the display unit 151 may be formed in a curved surface. Specifically, the four corner regions of the display unit 151 may be all formed in a curved surface.

The light guide plate 200 may be substantially formed in a plate shape.

Furthermore, the light guide plate 200 may include a front surface configured to place the display unit 151 thereon, a rear surface disposed at an opposite side to the front surface, and a plurality of lateral surfaces connecting the front and rear surfaces.

Hereinafter, a lateral surface most adjacent to a lower end of the body, a lateral surface most adjacent to an upper end thereof, and lateral surfaces adjacent to both lateral surfaces of the body may be referred to as a lower side surface 210, an upper side surface 220, and a left and a right side surface, respectively.

A chamfer surface 240 may be formed at a corner region of the light guide plate 200. More specifically, the chamfer surfaces 240 may be disposed at both corner regions, respectively, disposed at a lower end of the light guide plate 200.

On the other hand, both corner regions disposed at an upper end of the light guide plate 200 may be formed in a curved surface.

Here, the chamfer surface 240 may be a surface formed by cutting part of the corner region of the light guide plate 200 such that adjoining lateral surfaces of the light guide plate 200 form an angle other than 90 degrees.

The chamfer surface 240 may include a first and a second chamfer surface 241, 242 connected to each other. The first and the second chamfer surface 241, 242 may be disposed adjacent to a lower end and a lateral surface of the body, respectively.

In other words, the first chamfer surface 241 may be disposed between a lower lateral surface 210 of the light guide plate 200 and the second chamfer surface 242 to connect them. Furthermore, the second chamfer surface 242 may be disposed between the first chamfer surface 241 and a right side surface (or left side surface) 230 of the light guide plate 200 to connect them.

Referring to FIG. 3B, an angle (θ1) formed by the lower side surface 210 of the light guide plate 200 and the first chamfer surface 241 may form an angle other than a flat angle. An angle (θ2) formed by the left and the right side surface 230 of the light guide plate 200 and the second chamfer surface 242 may form an angle other than a flat angle.

Furthermore, a length of the first chamfer surface 241 may be formed to be smaller than that of the second chamfer surface 242. Specifically, the length of the first chamfer surface 241 may be formed to be larger than the width of at least two light-emitting devices. The detailed description thereof will be described again later.

On the other hand, a light-emitting device 310 is disposed within the terminal body associated with the present disclosure. The light-emitting device 310 may perform the role of supplying light to the display unit 151. For example, the light-emitting device 310 may be configured with an LED chip.

Referring to FIG. 3A, the light-emitting device 310 may be disposed adjacent to the light guide plate 200. According to the foregoing layout, light emitted from the light-emitting device 310 may be guided to the display unit 151 through the light guide plate 200.

More specifically, a plurality of the light-emitting devices 310 may be mounted in one column on a circuit board 320.

Here, referring to FIG. 4, a mounting surface 320a of the circuit board 320 may be disposed to face a lateral surface of the light guide plate 200.

Furthermore, a mounting surface 310a of the light-emitting device 310 may face a lateral surface of the light guide plate 200. Moreover, the mounting surface 310a of the light-emitting device 310 may be disposed in parallel to a lateral surface of the light guide plate 200.

The circuit board 320 may be extended from the lower side surface 210 of the light guide plate 200 to the first chamfer surface 241. Here, a first portion 321 of the circuit board 320 may face the lower side surface 210 of the light guide plate 200, and a second portion 322 thereof may face the first chamfer surface 241.

The first and the second portion 321, 322 of the circuit board 320 may be integrally formed. Alternatively, the first and the second portion 321, 322 may be respectively formed and then coupled to each other.

The first and the second portion 321, 322 may form a predetermined angle (more specifically, obtuse angle). Specifically, an angle formed by the first and the second portion 321, 322 may be designed in consideration with the formation angle (θ1) between the lower side surface 210 of the light guide plate 200 and the first chamfer surface 241 in such a manner that a distance from the lower side surface 210 of the light guide plate 200 to the first portion 321 is equal to a distance from the first chamfer surface 241 and the second portion 322.

At least part of the plurality of light-emitting device 310 is disposed adjacent to the chamfer surface 240 to emit light toward the chamfer surface 240. Here, the light-emitting device 310 may be disposed to emit light only to the first chamfer surface 241 between the first and the second chamfer surface 241, 242.

More specifically, the circuit board 320 may be extended from the first chamfer surface 241 at one corner region only to the first chamfer surface 241 at the other corner region, and thus the light-emitting device 310 may naturally emit light only to the first chamfer surface 241.

On the other hand, at least two light-emitting devices 310 may be disposed at the first portion 321 of the circuit board 320. In other words, the first portion may have a length in which at least two light-emitting devices 310 can be disposed side by side.

Referring to FIG. 4, a separation distance between the light-emitting devices 310 disposed on the circuit board 320 may be designed to be less than 0.5 mm. Furthermore, a distance from the light emitting surface 310a of the light-emitting device 310 to the light guide plate 200 may be designed to be 1.0-1.5 mm.

According to the structure of the light guide plate 200, light may be more uniformly guided to a corner region of the display unit 151 in a round shape. More specifically, the first and the second chamfer surface 241, 242 are formed at a portion facing the corner region of the display unit 151 in a round shape, and the light-emitting devices 310 may be disposed only on the first chamfer surface 241 between them, thereby enhancing a difference between a dark portion and a bright portion inevitably generated on the display unit 151.

On the other hand, according to the present disclosure, a thickness of a lower bezel may decrease while at the same increasing a light uniformity of the display unit 151. It will be described in detail with reference to the accompanying drawings.

Figure 5:
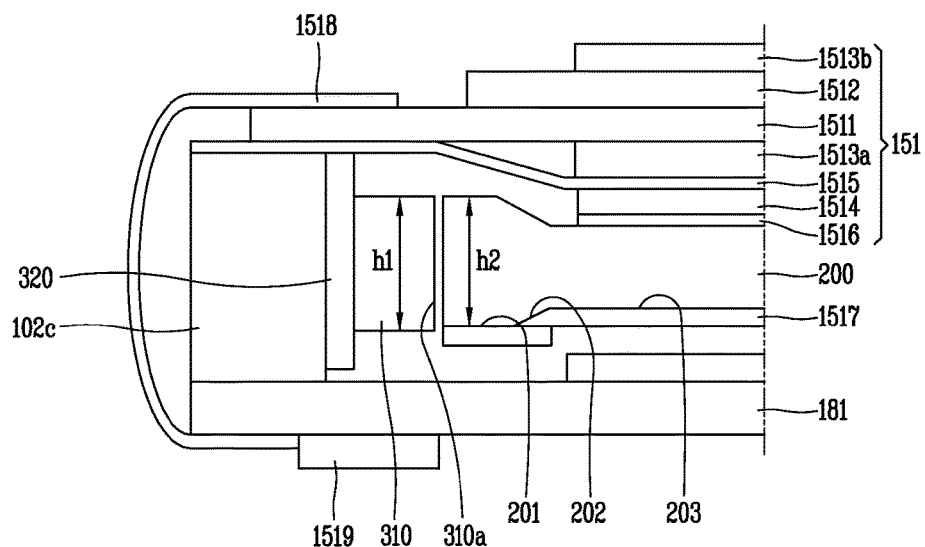
FIG. 5 is a view illustrating a partial configuration of a mobile terminal on a partial cross-sectional view.

FIG. 5 is a view illustrating a partial configuration of a mobile terminal on a partial cross-sectional view.

Referring to FIG. 5, the detailed structure of the display unit 151 is illustrated. Meanwhile, according to the present embodiment, the display unit 151 may be a liquid crystal display (LCD).

The display unit 151 may include a first and a second substrate 1511, 1512. The first substrate 1511 may be a thin film transistor array substrate, and the second substrate 1512 may be a color filter substrate. The first and the second substrate 1511, 1512 may be formed to overlap with each other, and a liquid crystal layer (not shown) may be formed between the first and the second substrate 1511, 1512.

The lengths (widths) of the first and the second substrate 1511, 1512 may be formed to be different from each other, thereby forming a non-overlapping region. For example, as illustrated in the drawing, when the first substrate 1511 has a larger length than the second substrate 1512, a partial region on an upper surface of the first substrate 1511 is exposed.

A connection film 1518 is mounted on one surface of the display unit 151, and applies a signal for driving the display unit 151 that has received from a drive integrated circuit 1519 to the display unit 151. The connection film 1518 is mounted in a region exposed to an outside of the first substrate 1511. For example, the connection film 1518 may be a COF film.

On the other hand, the drive integrated circuit 1519 is mounted on the printed circuit board 181. The connection film 1518 electrically connects the drive integrated circuit 1519 to the display unit 151. An external signal applied to the printed circuit board 181 is converted into a digital signal and supplied to the drive integrated circuit 1519, and a signal supplied to the drive integrated circuit 1519 is applied to the display unit 151 through the connection film 1518.

A first polarizing film 1513*a* is disposed below the first substrate 1511, and a second polarizing film 1513*b* is disposed on the second substrate 1512.

Either one of the first and the second polarizing film 1513*a*, 1513*b* is a vertical polarizer for allowing only light vibrating in a vertical direction to pass therethrough, and the other one is a horizontal polarizer for allowing only light vibrating in a horizontal direction to pass therethrough.

A prism sheet 1514 is disposed between the first polarizing film 1513*a* and the light guide plate 200. The prism sheet 1514 may scatter light emitted from the light-emitting device 310 in a horizontal direction to transfer the light in a vertical direction.

The prism sheet 1514 may include a finite prism structure for enhancing light scattering. The minute prism structure may be uniformly distributed on one surface of the prism sheet. Moreover, the minute prism structure may be more densely disposed as it is located away from the light-emitting device 310. In other words, as the density of the finite prism structure may increase as it is located away from the light-emitting device 310, light may be uniformly distributed as a whole on the light guide plate 200.

A protection sheet 1515 and a diffusion sheet 1516 may be disposed on and below the prism sheet 1514, respectively.

On the other hand, a reflection sheet 1517 may be disposed below the light guide plate 200. The reflection sheet 1517 may reflect light heading in a downward direction among light emitted from the light-emitting device in an upward direction. Accordingly, a larger amount of light may be supplied to the display unit 151.

On the other hand, according to the drawing, it is illustrated in that one end of the reflection sheet 1517 is substantially identical to one end of the light guide plate 200, but the present disclosure may not be necessarily limited to this. In other words, the reflection sheet may be extended and sealed up to one side surface of the light-emitting device 310 to directly provide a larger amount of light to the light guide plate 200.

On the other hand, an inclined portion 202 may be formed at one end of the light guide plate 200 in such a manner that a thickness thereof decreases as it goes to an inner side from the one end.

More specifically, a first portion 201 is formed at one end of the light guide plate 200. Furthermore, a second portion 203 is formed at an inner side of the light guide plate 200. The first and the second portion 201, 203 may be formed to have different thicknesses. A thickness of the first portion 201 may be larger than that of the second portion 203.

The inclined portion 202 may be formed between the first and the second portion 201, 203. Meanwhile, the inclined portion 202 may be formed at an upper and a lower side of the light guide plate 200 in a symmetrical manner.

On the other hand, as illustrated in FIG. 5, a height of the light-emitting device 310 may correspond to a thickness of the lateral surface of the light guide plate 200. More specifically, a height (h1) of the light-emitting device 310 may be substantially identical to a thickness (h2) of the first portion 201 of the light guide plate 200. Though not shown separately, in case of the light-emitting device 310 facing the chamfer surface 240, it is clear that a height thereof corresponds to a thickness of the chamfer surface 240.

In summary, a thickness of the light guide plate 200 in an inner region in which a relatively larger number of substrates and films are disposed is formed in a relatively low manner, and the thickness thereof in an outer region in which light is supplied from the light-emitting device is formed in a relatively high manner. Due to the foregoing structure, it may have an effect of reducing a thickness of the terminal while at the same providing a larger amount of light to the maximum extent possible.

On the other hand, a mold portion 102*c* is disposed at an opposite side of the mounting surface of the circuit board. Meanwhile, though not shown in the drawing, an adhesive material may be disposed between the mold portion 102*c* and the printed circuit board 181 to couple them to each other.

Here, the mold portion 102*c* may be separately formed from the front case or rear case, and disposed between them. Alternatively, the mold portion 102*c* may be integrally formed with the front case or rear case.

On the other hand, the mounting surface 310*a* of the light-emitting device 310 and the mounting surface 320*a* of the circuit board 320 are disposed to face a lateral surface of the light guide plate 200, thereby having an effect of reducing a length of the lower bezel. Moreover, the drive integrated circuit 1519 may be disposed on the printed circuit board 181 and connected to the display unit 151 through the connection film 1518, thereby further reducing a length of the lower bezel.

On the other hand, an antenna module may be formed at an upper or lower end of the mobile terminal 100.

In general, a LTE/WCDMA Rx Only antenna, a GPS antenna, a BT/WiFi antenna and the like may be used at an upper end of the mobile terminal 100, and a main antenna may be formed at a lower end of the mobile terminal 100.

An embodiment of the present disclosure may transmit and receive at least one or more frequency bands of the LTE/WCDMA Rx Only antenna, the GPS antenna, and the BT/WiFi antenna according to a frequency band.

Furthermore, a plurality of the antenna modules may be formed and disposed at each end portion of the terminal, and each antenna module may be formed to transmit and receive wireless signals at different frequency bands.

A frame 185 may be formed of a metal material to maintain sufficient rigidity even when formed with a low thickness. The frame 185 in a metal material may operate as a ground. In other words, the printed circuit board 181 or conductive members 131, 132 for antenna may be earth-connected to the frame 185, and the frame 185 may operate as a ground of the printed circuit board 181 or antenna. In this case, the frame 185 may extend the ground of the mobile terminal 100. Moreover, according to a second embodiment of the present disclosure, as illustrated in FIG. 2B, the rear cover 103 may further extend the ground region of the antenna.

Here, when the printed circuit board 181 is formed to occupy the most area of the terminal body without having the frame 185, the ground may be extended for the printed circuit board 181 itself.

The printed circuit board 181 may be electrically connected to antennas (ANT1 through ANT6), and configured to process wireless signals (or wireless electromagnetic waves) transmitted and received by the antennas (ANT1 through ANT6). For the processing of wireless signals, a plurality of transmitting and receiving circuits 182 may be formed or mounted on the printed circuit board 181.

The transmitting and receiving circuits may include one or more integrated circuits and electrical devices related thereto. For an example, the transmitting and receiving circuit may include a transmitting integrated circuit, a receiving integrated circuit, a switching circuit, an amplifier, and the like.

The plurality of transmitting and receiving circuits may feed power to conductive members, which are radiators, at the same time, to operate the plurality of antennas (ANT1 through ANT6) at the same time. For example, any one may receive while another one transmits, and both ones may transmit or receive.

A plurality of the transmitting and receiving circuits may be formed, and each of the transmitting and receiving circuits may be implemented in a communication chip form including at least one a call processor (CP), a modem chip, a RF transceiver chip, and a RF receiver chip. Due to this, each communication chip may feed power to a conductive member through a feeding portion and a matching module (including a variable switch 135) to transmit wireless signals or receive receiving wireless signals received by the conductive member through the matching module (including the variable switch 135) and feeding portion, thereby implementing predetermined receiving processing such as frequency conversion processing or demodulation processing.

In the related art, radiation may be carried out by a conductive pattern provided within the terminal body, thereby facilitating the securing of a radiation region. In order to maximize a radiation space of the conductive member, an additional antenna pattern may be required, and it may denote an increase of a basic antenna area.

Accordingly, when a metal member forming an appearance of the mobile terminal 100, for an example, the lateral surface portion 102*a* forming a lateral surface of the mobile terminal 100, is used for a radiator of the antenna, there is a limit in securing an open space without adding an antenna pattern. It will be described with reference to FIGS. 7A and 7B.

Figure 7A:
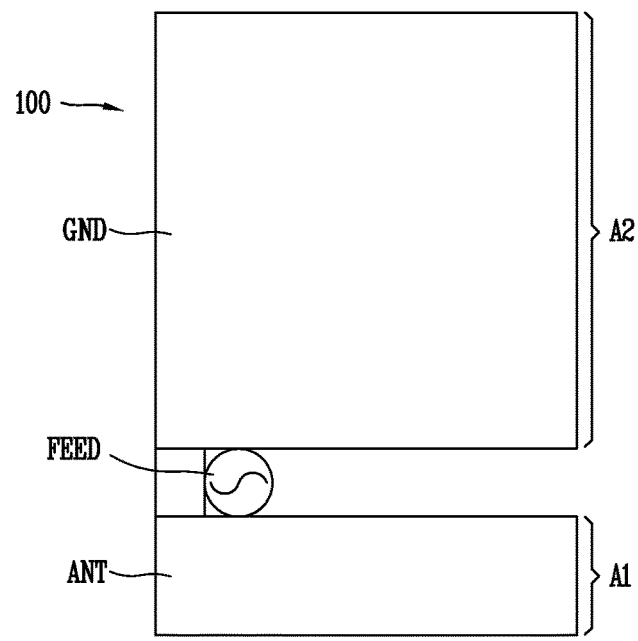
FIG. 7A is a conceptual view illustrating a comparative example of a slot antenna.
Figure 7B:
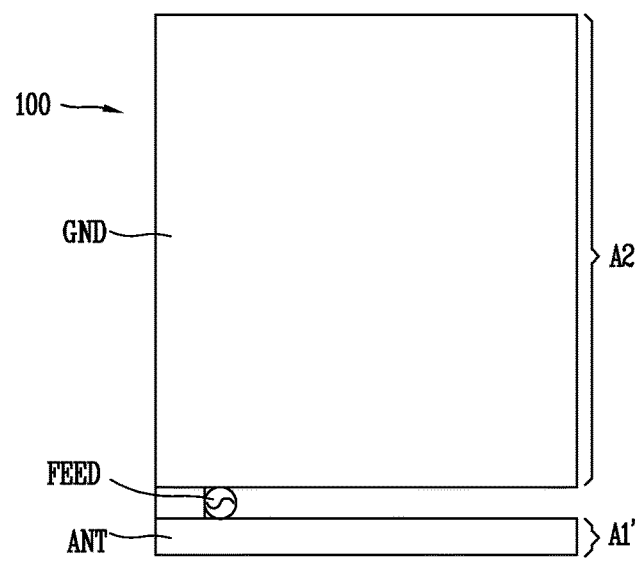
FIG. 7B is a conceptual view illustrating a slot antenna associated with an embodiment of the present disclosure.

FIG. 7A is a conceptual view illustrating a comparative example of a slot antenna, and FIG. 7B is a conceptual view illustrating a slot antenna associated with an embodiment of the present disclosure. In FIGS. 7A and 7B, it is illustrated that the size of a first radiation region (A1) in FIG. 7A is larger than that of a first radiation region (A1') in FIG. 7B, and the size of a second radiation region (A2) in FIG. 7A is the same as that of a second radiation region (A2') in FIG. 7B. Here, the first radiation region (A1, A1') denotes a radiation region dude to an antenna pattern (conductive pattern), and the second radiation region (A2) denotes a radiation region induced to the ground (GND).

In FIG. 7A, the first radiation region (A1) due to an antenna (ANT) is sufficiently secured and thus dependence on radiation due to the second radiation region (A2) is high, but in FIG. 7B, the first radiation region (A1') is not sufficiently secured and thus the radiation of the second radiation region (A2) should be induced due to the radiation performance degradation of the antenna (ANT). In other words, according to an embodiment of the present disclosure, the technology of utilizing a portion used as the ground (GND) for part of the antenna radiator is provided. However, according to an embodiment of the present disclosure, it does not necessarily means that radiation should be always carried out on the ground.

As described above, the ground (GND) may be extended to a radiation space of the antenna pattern to extend the radiation region, thereby maximizing radiation performance based on a given size of the ground.

Figure 6:
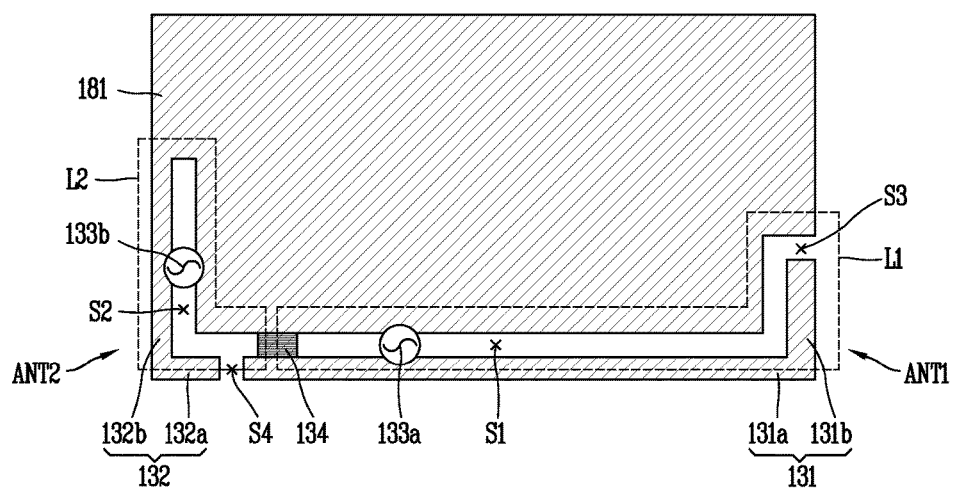
FIG. 6 is a conceptual view illustrating a mobile terminal for explaining an antenna device according to an embodiment of the present disclosure.
Figure 8A:
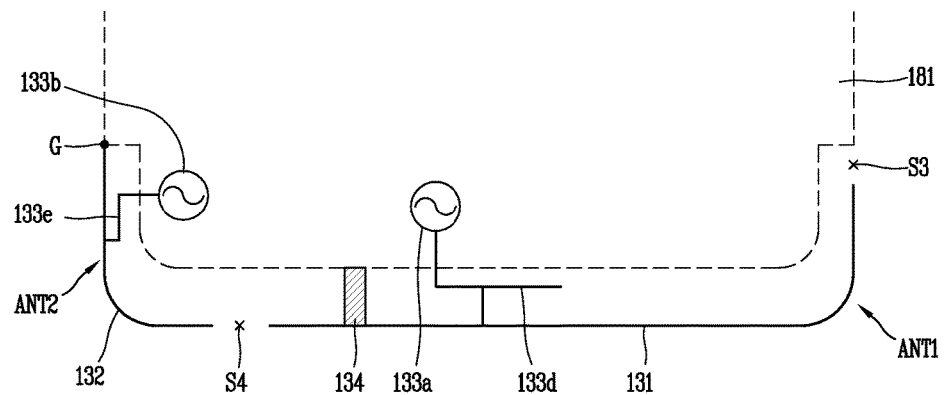
FIGS. 8A and 8C are views for explaining a lower antenna according to an embodiment of the present disclosure.

On the other hand, FIG. 6 is a conceptual view of the mobile terminal 100 for explaining an antenna device (ANT1, ANT2) according to an embodiment of the present disclosure, and FIG. 8A is a conceptual view illustrating an antenna device according to an embodiment of the present disclosure, and FIG. 6 will be described with reference to FIG. 8A.

According to an embodiment of the present disclosure, the conductive members 131, 132 formed to be separated from the ground provided within the terminal body may form a slot to form a slot antenna. The ground herein may be any one of the printed circuit board 181, the intermediate frame 185 (refer to FIG. 2A) and the rear cover 103 covering a rear surface of the terminal body, and hereinafter, a method of allowing the printed circuit board 181 to perform a function of the ground will be mainly described.

A mobile terminal 100 according to an embodiment of the present disclosure may include a first conductive member 131 formed to be separated from the ground 181 to form a first slot (S1), and a second conductive member 132 formed to be separated from the ground 181 to form a second slot (S2). The first conductive member 131 and second conductive member 132 may be substantially formed in directions crossing each other, and for example, when the first conductive member 131 is formed in a width direction of the mobile terminal 100, the second conductive member 132 may be formed in a length direction of the mobile terminal 100. However, it does not mean that the first conductive member 131 is formed only in a first direction, and the second conductive member 132 is formed only in a second direction, and it would be sufficient that a first loop (L1) which is a flow of current formed by the first conductive member 131 and a second loop (L2) which is a flow of current formed by the second conductive member 132 do not interfere with each other. Preferably, it would be sufficient that the first and the second loop (L1, L2) are formed in directions crossing each other.

Hereinafter, a direction in which most of the first conductive member 131 faces, and a direction in which most of the second conductive member 132 faces will be referred to as a first direction and a second direction, respectively.

In FIG. 6, it is illustrated that the first conductive member 131 includes a first sub-member 131*a* formed along the first direction and a second sub-member 131*b* formed along the second direction, and the second conductive member 132 includes a third sub-member 132*a* formed along the first direction and a fourth sub-member 132*b* formed along the second direction. Here, it is illustrated that a length of the first sub-member 131*a* is larger than that of the second sub-member 131*b,* and a length of the third sub-member 132*a* is larger than that of the fourth sub-member 132*b,* but the present disclosure may not be necessarily limited to this. In other words, a first open slot (S3) is formed between the first conductive member 131 and the ground 181, and a second open slot (S4) is formed between the first and the second conductive members 131, 132, and the positions of the first and the second open slot (S3, S4) may vary according to a resonant frequency desired to be implemented.

The first and the second conductive members 131, 132 may be a first antenna (ANT1) and a second antenna (ANT2) for implementing different resonant frequency bands, respectively, and a first resonant frequency band is implemented by the first antenna (ANT1), and a second resonant frequency band different from the first resonant frequency band is implemented by the second antenna (ANT2).

A first feeding portion 133a for feeding power to the first conductive member 131 is connected to the printed circuit board 181, and a second feeding portion 133b for feeding power to the second conductive member 132 is also connected to the printed circuit board 181. A junction portion 134 connected to the ground 181 is formed at one point of the first conductive member 131, and the junction portion 134 performs a function of a ground portion on the first antenna (ANT1). The junction portion 134 may be formed with a metal member having a predetermined area or a plurality of minute cables, and electrically connect the ground 181 to the first conductive member 131 to perform a function of dividing the first antenna (ANT1) and the second antenna (ANT2) while at the same grounding the first conductive member 131.

In other words, it is divided into the first antenna (ANT1) and the second antenna (ANT2) based on the junction portion 134.

On end portion of the first conductive member 131 is separated from the ground 181 to form a first open slot (S3), and one end portion of the second conductive member 132 is separated from the one end portion of the first conductive member 131 to form a second open slot (S4), and the other end portion thereof is connected to the ground 181. Here, the second open slot (S4) may be a slot for ear jack which is the audio output module 152.

The first and the second conductive members 131, 132 may serve as an antenna. Here, the second conductive member 132 may be directly connected to the ground 181 at a point (G) where the second conductive member 132 is connected to the ground 181. Furthermore, contact pins (C1 through C4) illustrated in FIG. 13A may be formed to ground the second conductive member 132 to the ground 181. In addition, one or more contact pins (C1 through C4) in contact with the ground 181 may be formed at one or more points of a portion excluding the first through the fourth conductive member (131, 132, 131', 132') on a lateral surface portion of the mobile terminal 100.

It is also the same in a second embodiment of the present disclosure. In other words, though not shown in FIG. 13B, a plurality of contact pins (C1 through C4) connected to the ground may be formed at a lateral surface portion of the case 103. Moreover, contact pins (C1 through C4) may be also formed on a rear surface portion of the case 103 covering the printed circuit board 181.

Figure 9A:
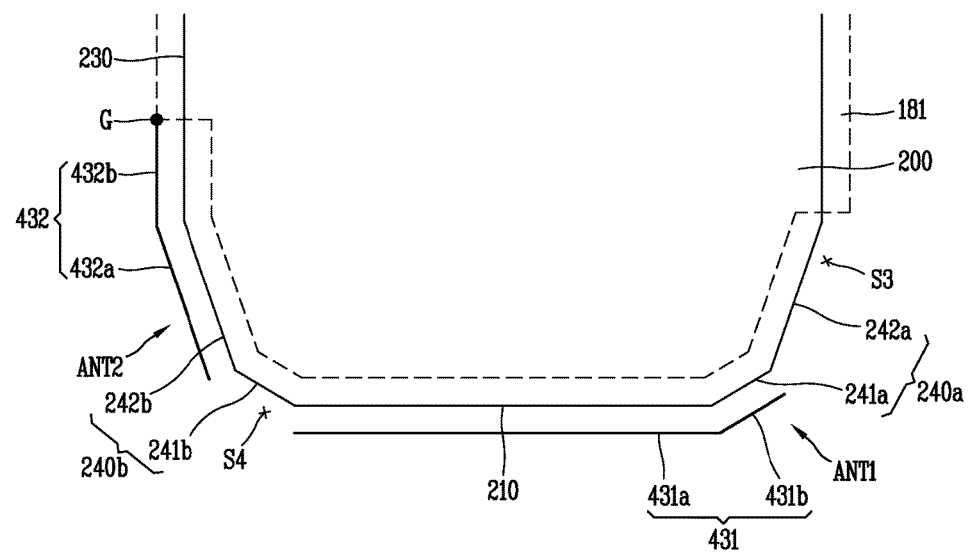
FIGS. 9A and 9B are views for explaining a lower antenna according to another embodiment of the present disclosure.
Figure 9B:
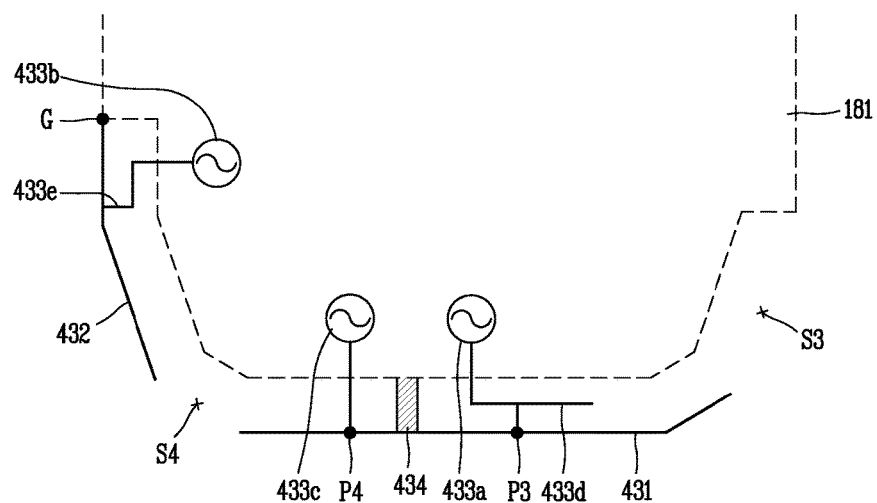

FIGS. 9A and 9B are views for explaining a lower antenna according to another embodiment of the present disclosure.

According to the present embodiment, a lower antenna (ANT1, ANT2) may be disposed between the body and the light guide plate 200, and at least part thereof may be formed in a shape corresponding to the chamfer surface.

On the other hand, hereinafter, reference numerals 240a, 241a, 242a will be given to a chamfer surface, a first and a second chamfer surface at one corner region on which a first conductive member 431 is disposed. Furthermore, reference numerals 240b, 241b, 242b will be given to a chamfer surface, a first and a second chamfer surface at the other corner region on which a second conductive member 432 is disposed.

For example, the first conductive member 431 may include a first and a second sub-member 431a, 431b. Here, the first sub-member 431a may be formed along a first direction, and the second sub-member 431b may be formed along a second direction.

More specifically, the first direction may be one direction in parallel to the lower side surface 210 of the light guide plate, and the second direction may be a direction in parallel to the first chamfer surface 241a of the light guide plate.

Furthermore, a length of the first sub-member 431a may be formed to be larger than that of the second sub-member 431b. The length of the first sub-member 431a substantially corresponds to that of the lower side surface 210 of the light guide plate, and the length of the second sub-member 431b substantially corresponds to that of the first chamfer surface 241a of the light guide plate.

The second conductive member 432 may include a third and a fourth sub-member 432a, 432b. Here, the third sub-member 432a may be formed along a third direction, and the fourth sub-member 432b may be formed along a fourth direction.

More specifically, the third direction may be one direction in parallel to the second chamfer surface 242b of the light guide plate, and the fourth direction may be one direction in parallel to the left and the right side surface 230 of the light guide plate.

Furthermore, a length of the third sub-member 432a may be formed to be larger than that of the fourth sub-member 432b. The length of the third sub-member 432a substantially corresponds to that of the second chamfer surface 242b of the light guide plate. The length of the fourth sub-member 432b may vary based on the formation position of the ground.

On the other hand, one end portion of the first conductive member 431 may be separated from the ground (specifically, printed circuit board 181) to form a first open slot (S3). More specifically, the first open slot (S3) may be formed to face the second chamfer surface 242a.

One end portion of the second conductive member 432 may be separated from the one end portion of the first conductive member 431 to form a second open slot (S4). More specifically, the second open slot (S4) may be formed to face the first chamfer surface 241b.

Referring to FIG. 9B, a junction portion 434 is formed at one point of the first conductive member 431 to ground the first conductive member 431 to the ground 181.

A first and a second feeding portion 433a, 433b may be configured to feed power to the first and the second conductive member 431, 432, respectively. A third feeding portion 433c is configured to feed power to the first conductive member 431 at an opposite position to the first feeding portion 433a around the junction portion 434 of the first conductive member 431.

Feeding extension portions 433d, 433e may be formed on at least one of the first through the third feeding portion 433a, 433b, 433c. For example, in FIG. 9B, it is illustrated that the feeding extension portions 433d, 433e are formed on the first and the second feeding portion 433a, 433b.

According to the present embodiment, the first and the second conductive member 431, 432 are formed to correspond to the shape of the light guide plate 200, and thus disposed within the terminal body in a more compact manner.

Figure 10A:
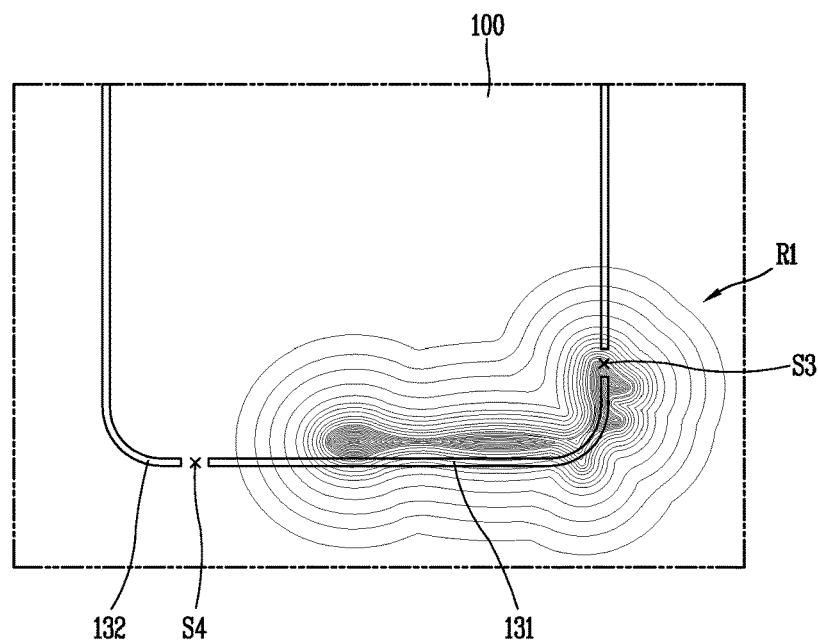
FIG. 10A is a view schematically illustrating a radiation pattern due to a first conductive member according to an embodiment of the present disclosure.
Figure 10B:
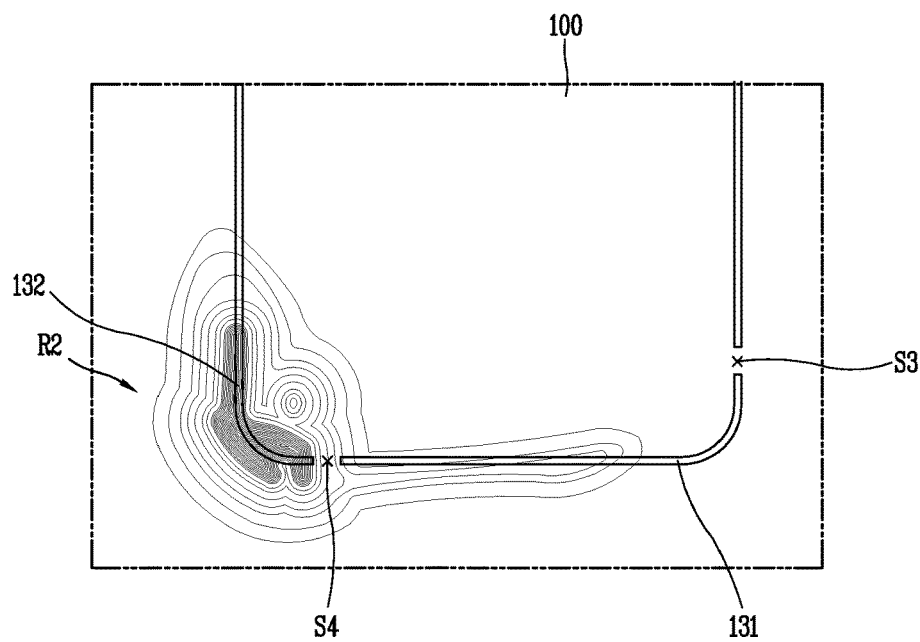
FIG. 10B is a view schematically illustrating a radiation pattern due to a second conductive member according to an embodiment of the present disclosure.
Figure 12:
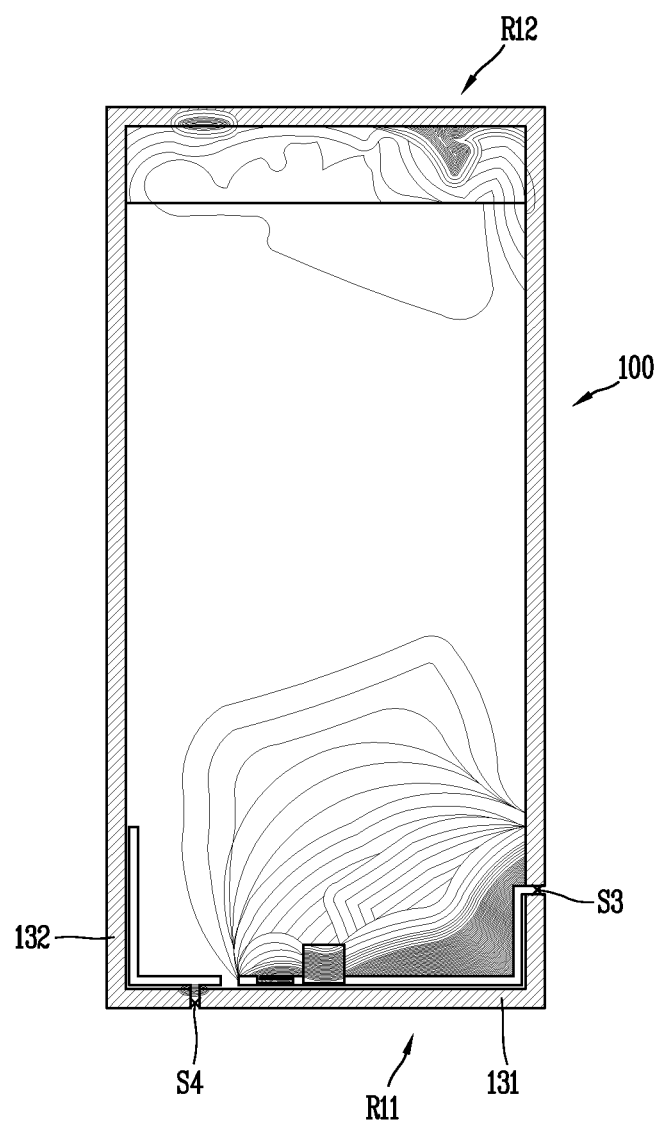
FIG. 12 is a view schematically illustrating a radiation pattern due to a first conductive member according to a first embodiment of the present disclosure for the entire mobile terminal.

FIG. 10A is a view schematically illustrating a radiation pattern due to the first conductive member 131 according to an embodiment of the present disclosure, and FIG. 10B is a view schematically illustrating a radiation pattern due to the second conductive member 132 according to an embodiment of the present disclosure, and FIG. 12 is a view schematically illustrating a radiation pattern due to the first conductive member 131 according to a first embodiment of the present disclosure for the entire mobile terminal 100.

Referring to FIGS. 10A and 10B, a radiation region (R1) due to the first conductive member 131 is mostly formed at a lower right end of the mobile terminal 100, and a radiation region (R2) due to the second conductive member 132 is mostly formed at a lower left end of the mobile terminal 100, and thus it is seen that they are not interfered with each other. Moreover, it is seen that a radiation pattern due to the first conductive member 131 is mostly formed along a first direction, and a radiation pattern due to the second conductive member 132 is mostly formed along a second direction, and thus it is seen that radiation patterns due to the first and the second conductive members 131, 132 may not have a significant effect on each other and independently secure the radiation regions.

Furthermore, according to an embodiment of the present disclosure, the first and the second conductive members 131, 132 may be formed in an "L"-type, and due to this, an electric field around a corner region of the mobile terminal 100 may be induced to the maximum, thereby more broadly securing radiation regions. For example, it may be possible to maximize the radiation of the ground. More specifically, in order to implement a low band resonant frequency among frequency bands implemented in the mobile terminal 100, the mobile terminal 100 may be typically formed to have a wavelength size corresponding to the low band resonant frequency or above, and according to an embodiment of the present disclosure, in case of a slot antenna, a length in the length direction of the mobile terminal 100 is formed to be larger than ¼ times of the wavelength (λ) corresponding to the center frequency of the low band. Here, in order to compensate the reduction of radiation performance due to a shortage of the radiation region by the first conductive member 131, according to an embodiment of the present disclosure, the radiation of the ground is more actively carried out. In other words, an electric field in the first and the second conductive members 131, 132 according to an embodiment of the present disclosure may be set to be the maximum value in the vicinity of a corner region of the mobile terminal 100.

Moreover, according to an embodiment of the present disclosure, a low band and a high band frequency may be implemented by the first conductive member 131, and a middle band frequency may be implemented by the second conductive member 132. In order to implement a low band frequency, an electric field distribution due to the first conductive member 131 is set to be the maximum value in the vicinity of a corner thereof, and according to an embodiment of the present disclosure, as illustrated in FIG. 12, the radiation of the ground is carried out at an upper side (R12) of the mobile terminal 100 as well as a lower side (R11) thereof. To this end, according to an embodiment of the present disclosure, the first and the second open slot (S3, S4) are formed adjacent to a corner region of the mobile terminal 100. It uses a phenomenon in which an electric field is concentrated and distributed in the vicinity of the open slot.

However, the second conductive member 132 implements a middle band frequency, and the radiation of the ground may not be necessarily generated from an upper side of the mobile terminal 100 to implement a middle band frequency bandwidth.

On the other hand, according to an embodiment of the present disclosure, the position of a portion connected between the first conductive member 131 and the junction portion 134 may be adjusted according to a frequency band desired to be implemented, and an additional feeding portion may be further formed on the first conductive member 131 to add a frequency band desired to be implemented. For example, FIG. 8C is a view for explaining a third antenna (ANT3) device according to an embodiment of the present disclosure, which is a view to which a third feeding portion 133c is added to FIG. 8A. However, here, a position at which the junction portion 134 is connected to the first conductive member 131 may vary.

As described above, the junction portion 134 may perform a function of a ground portion on the first conductive member 131 while at the same performing a function of dividing antennas due to the first and the second conductive members 131, 132, thereby allowing part of the first conductive member 131 to operate as the first antenna (ANT1) while at the same allowing the rest of the first conductive member 131 to operate as the third antenna (ANT3). To this end, as illustrated in FIG. 8C, a third feeding portion 133c may be formed at an side opposite to a position at which the first feeding portion 133a is formed on the first conductive member 131. In other words, the junction portion 134 is formed between a point (P3) at which the first feeding portion 133a is connected to the first conductive member 131 and a point (P4) at which the third feeding portion 133c is connected to the first conductive member 131.

Here, the ground portion of the third antenna (ANT3) formed by the first conductive member 131 and third feeding portion 133c may be carried out by the junction portion 134. In other words, a radiator of the first antenna (ANT1) is a portion formed from a point connected to the junction portion 134 to the first open slot (S3) via a point connected to the first feeding portion 133a on the first conductive member 131, and a radiator of the second antenna (ANT2) is the second conductive member 132, and a radiator of the third antenna (ANT3) is a portion formed from a point connected to the junction portion 134 to the second open slot (S4) via a point connected to the third feeding portion 133c on the first conductive member 131, which is formed up to an end portion facing the second conductive member 132.

In the above, an antenna formed at a lower end portion of the mobile terminal 100 has been mainly described, but the present disclosure may not be necessarily limited to this, and an antenna for implementing a plurality of frequency bands may be also formed in the same manner at an upper end of the mobile terminal 100.

Figure 8B:
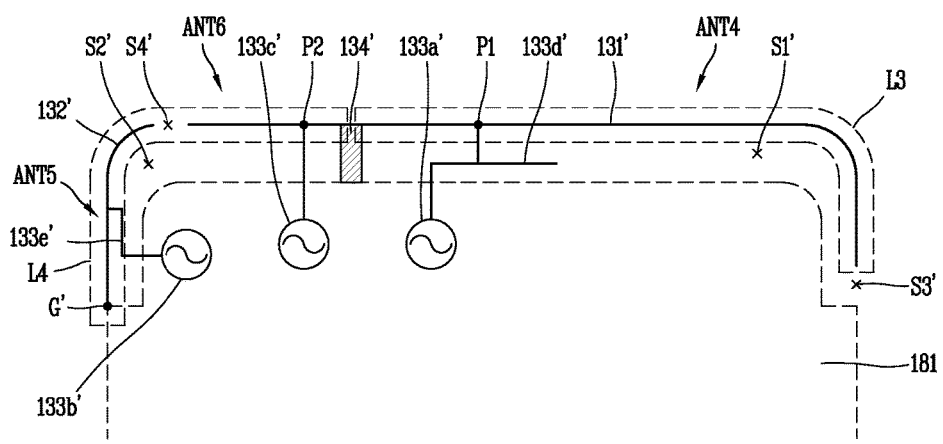
FIG. 8B is a view for explaining an upper antenna according to an embodiment of the present disclosure.
Figure 8C:
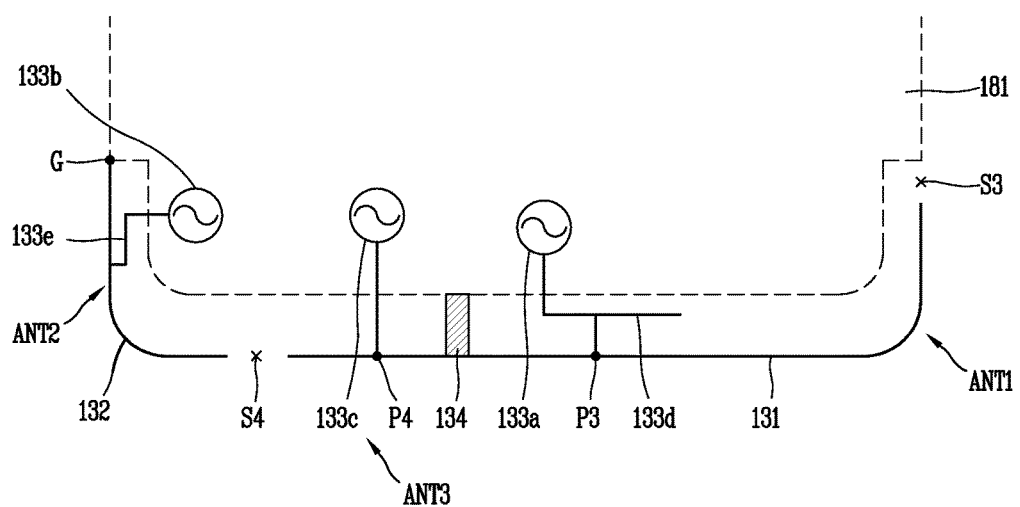

In other words, FIG. 8B is a view for explaining an upper antenna according to an embodiment of the present disclosure, and it is seen that the upper antenna is formed in a similar manner as illustrated in FIG. 8C.

Hereinafter, antennas (ANT4 through ANT6) formed at an upper end of the mobile terminal 100 will be described with reference to FIG. 8B.

Referring to FIG. 8B, a third and a fourth conductive member 131', 132' formed to be separated from the printed circuit board 181 performing a ground function by a predetermined distance may be formed, and a junction portion 134' may be connected to the third conductive member 131', and a fourth and a fifth feeding portion 133a', 133b' may be formed on the third and the fourth conductive member 131', 132', respectively, to form a fourth and a fifth antenna (ANT4, ANT5). In addition, a sixth feeding portion 133c' may be formed at a side opposite to the fourth feeding portion 133a' at one point of the third conductive member 131' to implement a sixth antenna (ANT6). Here, a third and a fourth loop (L3, L4) are formed by the third and the fourth conductive member 131', 132'.

The fourth through the sixth antenna (ANT4 through ANT6) formed at an upper side of the mobile terminal 100 may be formed in the same manner as the first through the third antenna (ANT1 through ant3), and thus the detailed description thereof will be omitted.

On the other hand, a feeding extension portion 133d, 133d', 133e, 133e' may be formed on at least one or more of a first through a sixth feeding portion 133a, 133a', 133b, 133b', 133c, 133c' extended to the printed circuit board 181 and the first through the fourth conductive member 131, 131', 132, 132'. The feeding extension portion 133d, 133d', 133e, 133e' is an element for impedance matching.

Figure 11:
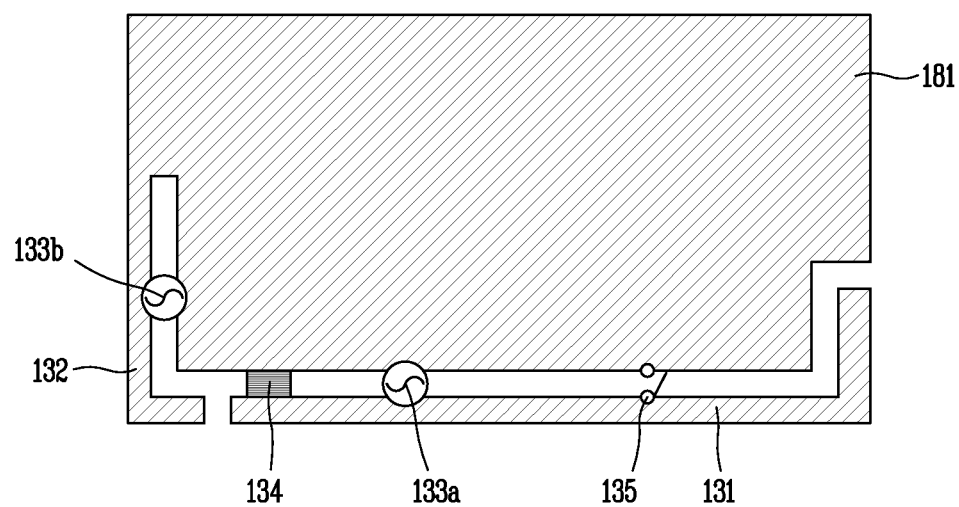
FIG. 11 is a view for explaining that a switch is formed on an antenna of a mobile terminal according to an embodiment of the present disclosure.

FIG. 11 is a view for explaining that a switch 135 is formed on an antenna of the mobile terminal 100 according to an embodiment of the present disclosure. Referring to FIG. 11, the switch 135 connected between the printed circuit board 181 and one point of the first conductive member 131 or second conductive member 132 may be formed. The switch 135, which is an element for varying a resonant frequency, may be also referred to as a matching module or a matching portion for impedance matching, and formed on the first slot (S1) or second slot (S2).

The switch 135 may be formed in various combinations of capacitors and an inductors. For example, the switch 135 may have only a different size of inductor or have an inductor and a capacitor together or have only one inductor. Furthermore, the switch 135 may have an inductor and a variable capacitor connected in series or have a variable capacitor or have an inductor and a variable capacitor connected in parallel.

The foregoing examples are merely an example, and a variable inductor may be used or a single pole double throw (SPDT) 135 and a single pole triple throw (SP3T) 135 may be also used. Here, it may be possible to decrease a resonant frequency when an inductor is used, and increase a resonant frequency when a capacitor is used, and vary a resonant frequency by an appropriate combination of them. The variable switch 135 will be apparent to those skilled in this art, and thus the detailed description thereof will be omitted herein.

Hereinafter, a method of implementing the foregoing first through fourth conductive members 131, 131', 132, 132' or the first through the sixth antenna (ANT1 through ANT6) on the mobile terminal 100 will be described in detail.

Figure 13A:
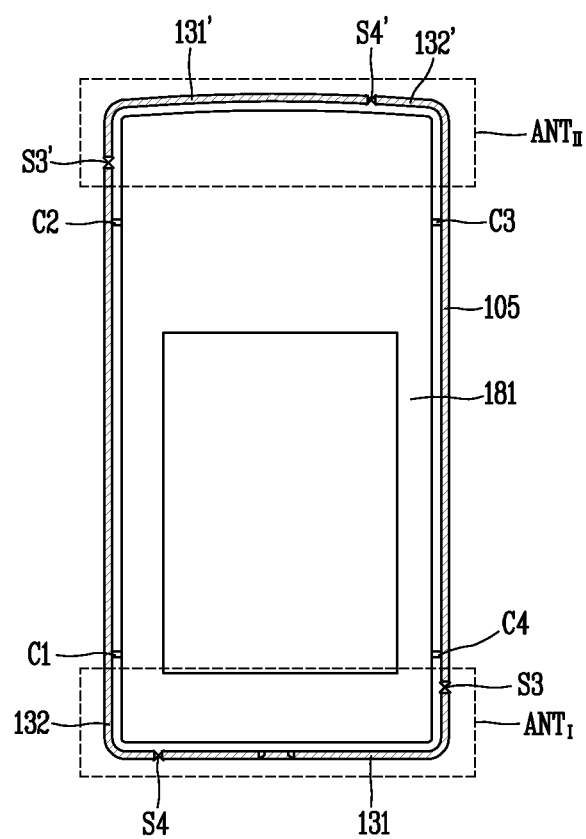
FIG. 13A is a view schematically illustrating a conductive member operating as an antenna of a mobile terminal having a rear cover.

FIG. 2A is an exploded view illustrating the mobile terminal 100 according to a first embodiment of the present disclosure, and FIG. 13A is a view schematically illustrating a conductive member operating as an antenna of the mobile terminal 100 corresponding to FIG. 2A. Referring to FIGS. 2A and 13A, the first through the fourth conductive member 131, 131', 132, 132' form a lateral surface 102a of the mobile terminal 100, and are exposed to an outside, and the first and the second open slot (S3, S4) are formed on the first and the second conductive member 131, 132, and the third and the fourth open slot (S3', S4') are formed on the third and the fourth conductive member 131', 132'. In FIG. 13A, feeding portions are omitted, and it is the same in FIG. 13B. Here, the foregoing first through third antennas (ANT1 through ANT3) are a lower antenna (ANT1), and the fourth through the sixth antenna (ANT4 through ANT6) are an upper antenna (ANTII).

According to a first embodiment of the present disclosure, a lateral surface portion 102a including the first and the second conductive members 131, 132 is formed of a metal member, and part of the lateral surface portion 102a operates as an antenna, and the rear cover 103 is formed of a non-metal member. Furthermore, though not shown in the drawing, a feeding extension portion 133d or conductive pattern (not shown) may be additionally formed on one surface of the rear case 102.

The first embodiment of the present disclosure may use part of the metal member forming a lateral surface of the mobile terminal 100 as an antenna, and thus referred to as a metal ring structure.

On the contrary, the second embodiment of the present disclosure is the same in using part of the metal member forming a lateral surface of the mobile terminal 100 as an antenna, but the case 103 accommodating the display unit 151 may be formed with a single configuration to use a part covering a rear surface of the case 103 as metal member, and thus referred to as a metal cover structure.

Figure 13B:
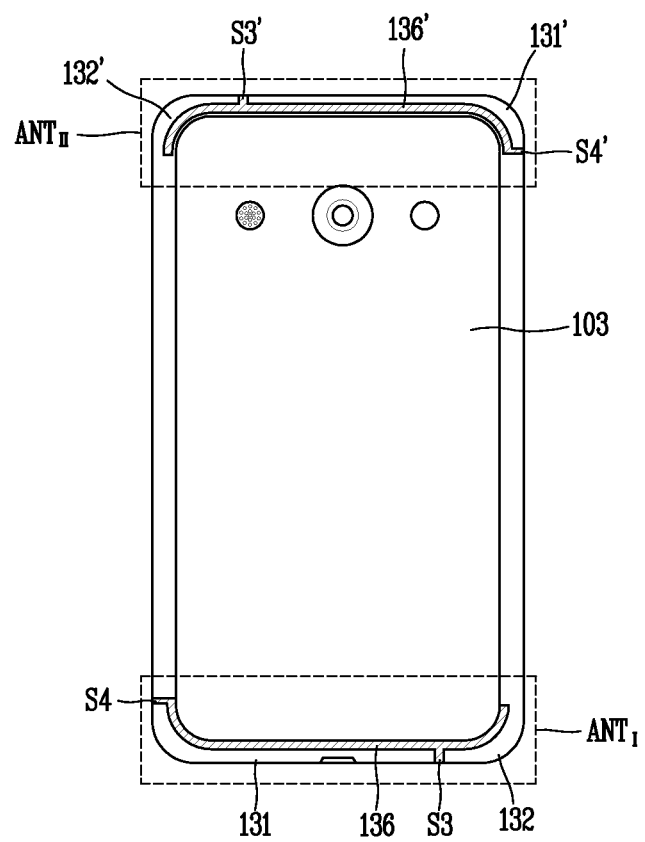
FIG. 13B is a view schematically illustrating a conductive member in a mobile terminal corresponding to FIG. 2.

FIG. 2B is a perspective view illustrating the mobile terminal 100 according to a second embodiment of the present disclosure, and FIG. 13B is a view schematically illustrating a conductive member operating as the rear cover 103 and an antenna on the mobile terminal 100 corresponding to FIG. 2A.

The mobile terminal 100 according to a second embodiment of the present disclosure may be a uni-type of terminal, and the display unit 151 is accommodated into one case 103. Here, the rear surface of the case 103 may be formed of a metal material, and when a portion covering a rear surface of the mobile terminal 100 is formed of a metal material, it may have an effect on the performance of radiation due to the first through the fourth conductive member 131, 131', 132, 132'. Accordingly, according to a second embodiment of the present disclosure, a non-metal member 136, 136' is formed to electrically insulate a rear portion occupying the first through the fourth conductive member 131, 131', 132, 132' from the most rear surface of the mobile terminal 100. The non-metal member 136, 136' may be polycarbonate, for an example, and may not be necessarily limited if it is a non-metal material. Furthermore, as illustrated in FIG. 13A, a plurality of contact pins (C1, C2, C3, C4) connected between the ground 181 and the lateral surface portion 102a, thereby disallowing the lateral surface portion 102a other than the first through the fourth conductive member 131, 131', 132, 132' to have an effect on the radiation performance of the antennas. In other words, the contact pins (C1, C2, C3, C4) may be formed on a portion other than the first through the fourth conductive member 131, 131', 132, 132'.

Figure 14A:
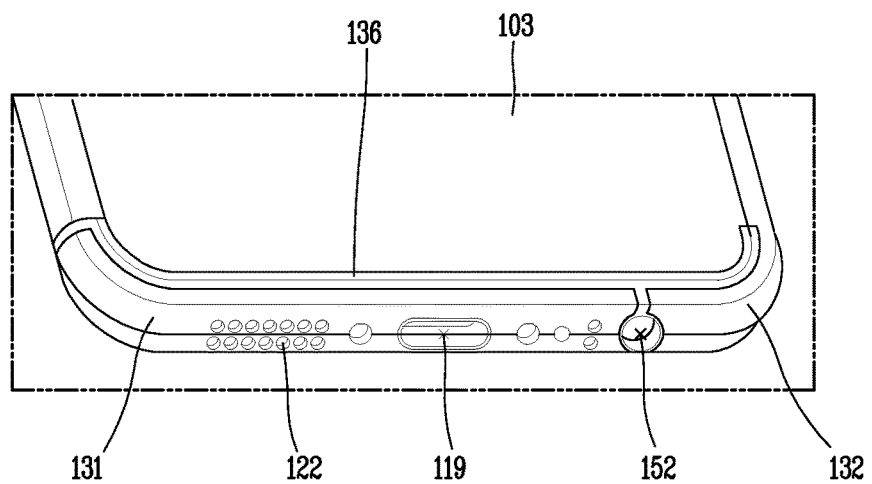
FIG. 14A is a rear perspective view of a mobile terminal according to a second embodiment of the present disclosure.
Figure 14B:
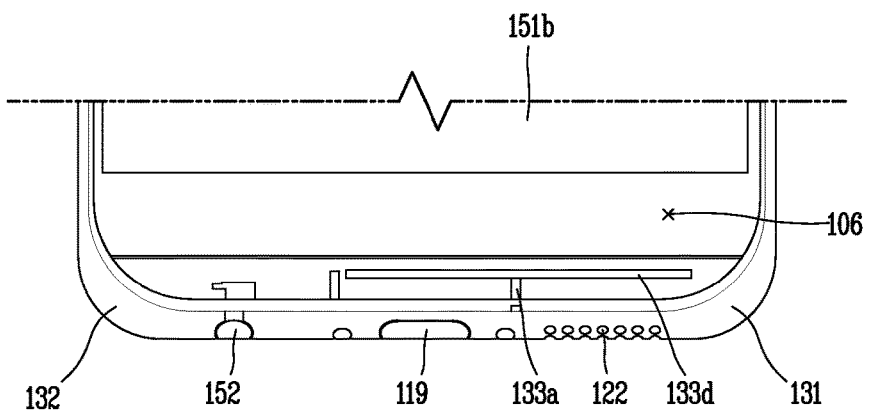
FIG. 14B is a front perspective view in a configuration that a window of the mobile terminal according to the second embodiment of the present disclosure is removed.
Figure 14C:
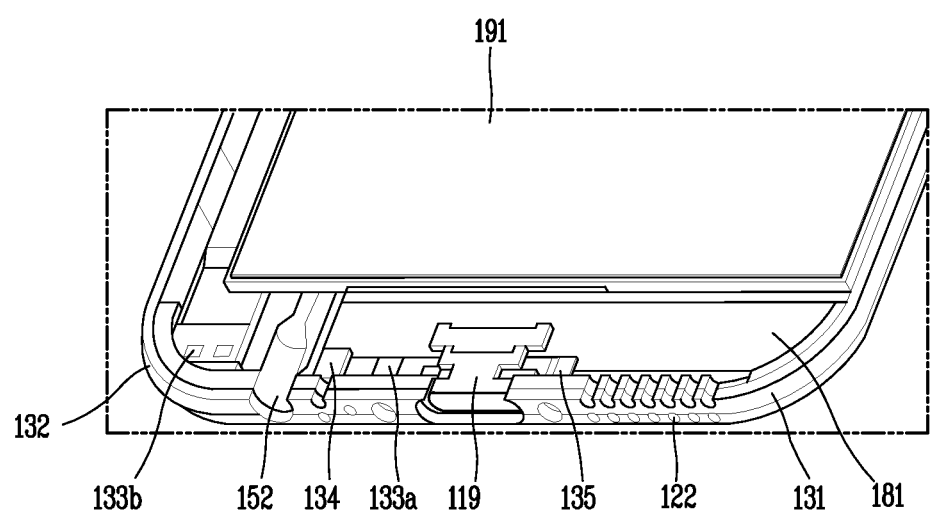
FIG. 14C is a front perspective view of a mobile terminal in a configuration that the display unit is removed in FIG. 14B.

FIG. 14A is a rear perspective view of the mobile terminal 100 according to a second embodiment of the present disclosure, and FIG. 14B is a front perspective view in a configuration that a window 151a of the mobile terminal 100 according to the second embodiment of the present disclosure is removed, and FIG. 14C is a front perspective view of the mobile terminal 100 in a configuration that the display unit 151 is removed in FIG. 14B. In other words, FIG. 14B illustrate a configuration in which only the window 151a is removed from the display unit 151, and a display module 151b is provided on the terminal body.

As illustrated in FIG. 14A through 14C, the case 103 which is a metal member of the mobile terminal 100 according to a second embodiment of the present disclosure may have an effect on the performance of antennas, and thus as illustrated in FIG. 14A, the non-metal member 136, 136' may be provided to electrically insulate the first and the second conductive members 131, 132 from the case 103. Furthermore, the first feeding portion 133a and the feeding extension portion 133d of the first feeding portion 133a for feeding power to the first conductive member 131 may be formed up to the vicinity of a front surface of the mobile terminal 100. More specifically, the first feeding portion 133a and feeding extension portion 133d may be formed on the printed circuit board 181 and extended up to a rear surface of the display unit 151. However, the first feeding portion 133a and feeding extension portion 133d may not be necessarily formed in the vicinity of a front surface of the mobile terminal 100, but metal members associated with the performance of antennas may be preferably separated from the case 103 to minimize the effect of the case 103.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal comprising:
    a body;
    a light-emitting device;
    a display disposed at a front side of the body, wherein the display comprises a curved corner; and
    a light guide plate disposed beneath the display and configured to guide light emitted from the light-emitting device to the display,
    wherein the light guide plate comprises a chamfer surface at a region of the light guide plate corresponding to the curved corner of the display, and
    wherein the light-emitting device is disposed adjacent to the light guide plate and configured to emit light toward the chamfer surface.

2. The mobile terminal of claim 1, wherein the chamfer surface comprises:
    a first chamfer surface and an adjacent second chamfer surface disposed between a first lateral side and a second lateral side of the light guide plate.

3. The mobile terminal of claim 2, wherein a length of the first chamfer surface is shorter than a length of the second chamfer surface.

4. The mobile terminal of claim 2, wherein:
    the light-emitting device comprises one or more light-emitting devices disposed to face the first chamfer surface; and
    no light-emitting devices are disposed to face the second chamfer surface.

5. The mobile terminal of claim 2, further comprising:
    a ground region;
    a first conductive member adjacent to a first side of the ground region; and
    a second conductive member adjacent to a second side of the ground region opposite the first side and disposed at one side of the first conductive member,
    wherein the first conductive member is formed along a first plane and the second conductive member is formed along a second plane, and the first plane and second plane intersect.

6. The mobile terminal of claim 5, wherein the first conductive member and the second conductive member are disposed at a lower end of the body.

7. The mobile terminal of claim 5, wherein:
    the first conductive member and the second conductive member are disposed between the body and the light guide plate; and
    at least a portion of the first conductive member or a portion of the second conductive member is shaped to correspond to the chamfer surface.

8. The mobile terminal of claim 5, wherein:
    a first open slot is defined by a separation between a first end of the first conductive member and the ground region;
    a second open slot is defined by a separation between a first end of the second conductive member and a second end of the first conductive member; and
    the first open slot and the second open slot are defined at locations respectively corresponding to the chamfer surface at the region of the light guide plate and another chamfer surface at another region of the light guide plate.

9. The mobile terminal of claim 5, wherein the first conductive member comprises:
    a first sub-member formed along the first plane; and
    a second sub-member formed along a third plane intersecting the first plane;
    wherein a length of the first sub-member is longer than a length of the second sub-member.

10. The mobile terminal of claim 5, wherein the second conductive member comprises:
    a third sub-member formed along the second plane; and
    a fourth sub-member formed along a fourth plane intersecting the second plane,
    wherein a length of the third sub-member is longer than a length of the fourth sub-member.

11. The mobile terminal of claim 5, further comprising:
    a junction portion configured to ground the first conductive member to the ground region;
    a first feeding portion configured to feed power to the first conductive member; and
    a second feeding portion configured to feed power to the second conductive member.

12. The mobile terminal of claim 11, further comprising:
    a third feeding portion configured to feed power to the first conductive member at a position along the first conductive member opposite from a position of the first feeding portion with respect to the junction portion.

13. The mobile terminal of claim 5, wherein the first conductive member and the second conductive member each comprise a curved surface.

14. The mobile terminal of claim 1, wherein:
    the mobile terminal further comprises a circuit board; and
    the light-emitting device comprises a row of a plurality of light-emitting devices coupled to the circuit board and facing the chamfer surface.

15. The mobile terminal of claim 14, wherein the circuit board is configured to extend from a first lateral side of the light guide plate to the first chamfer surface.

16. The mobile terminal of claim 1, wherein the light-emitting device comprises a plurality of light-emitting devices disposed parallel to the chamfer surface.

17. The mobile terminal of claim 1, wherein a height of the light-emitting device corresponds to a thickness of the chamfer surface.

18. The mobile terminal of claim 1, wherein an outer region of the light guide plate is thicker than an inner region of the light guide plate.

19. The mobile terminal of claim 18, wherein the light guide plate comprises a declined portion at a top side and a corresponding declined portion at a bottom side from the outer region to the inner region.

20. The mobile terminal of claim 1, wherein the chamfer surface is disposed at a first end of the light guide plate, and a second end of the light guide plate opposite the first end comprises curved corners.

* * * * *